United States Patent
Wardman et al.

(10) Patent No.: US 10,021,118 B2
(45) Date of Patent: Jul. 10, 2018

(54) PREDICTING ACCOUNT TAKEOVER TSUNAMI USING DUMP QUAKES

(71) Applicant: PAYPAL, INC., San Jose, CA (US)

(72) Inventors: Bradley Wardman, Phoenix, AZ (US); Ryan A. Carrico, Scottsdale, AZ (US); Igor Bulavko, Dublin, CA (US)

(73) Assignee: PayPal, Inc., San Jose, CA (US)

( * ) Notice: Subject to any disclaimer, the term of this patent is extended or adjusted under 35 U.S.C. 154(b) by 118 days.

(21) Appl. No.: 14/841,947

(22) Filed: Sep. 1, 2015

(65) Prior Publication Data
US 2017/0063885 A1    Mar. 2, 2017

(51) Int. Cl.
| | |
|---|---|
| G06F 11/00 | (2006.01) |
| G06F 12/14 | (2006.01) |
| G06F 12/16 | (2006.01) |
| G08B 23/00 | (2006.01) |
| H04L 29/06 | (2006.01) |

(52) U.S. Cl.
CPC ...... *H04L 63/1416* (2013.01); *H04L 63/1425* (2013.01); *H04L 63/107* (2013.01); *H04L 63/20* (2013.01)

(58) Field of Classification Search
CPC ............. H04L 63/1416; H04L 63/1425; H04L 63/107; H04L 63/20
See application file for complete search history.

(56) References Cited

U.S. PATENT DOCUMENTS

| | | | |
|---|---|---|---|
| 9,485,271 B1* | 11/2016 | Roundy | H04L 63/1441 |
| 2005/0216955 A1* | 9/2005 | Wilkins | H04L 63/1408 726/23 |
| 2015/0066763 A1 | 3/2015 | Yu | |
| 2016/0057169 A1* | 2/2016 | Honda | H04L 63/083 726/1 |

OTHER PUBLICATIONS

Abdulnabi, Alaa, RSA® Web Threat Detection—Online Threat Detection in Real Time, EMC®, 2013, 30 pages.

* cited by examiner

*Primary Examiner* — Trong Nguyen
(74) *Attorney, Agent, or Firm* — Haynes & Boone, LLP

(57) ABSTRACT

Methods, systems, and computer program products for predicting an account takeover tsunami using dump quakes are disclosed. A computer-implemented method may include analyzing activity for a plurality of user accounts based on detecting an abnormal increase in system activity, determining the abnormal increase in the system activity is associated with account validation attacks performed by an unauthorized party, identifying attributes of a plurality of user accounts associated with the account validation attacks, searching online locations using the identified attributes of the user accounts to find a data breach source, monitoring the online locations periodically based on the identified attributes of the user accounts to detect future publication of a dump of private user data, sending a notification to another organization in advance of the publication of the dump of private user data to allow the other organization to adjust security of one or more other systems in advance.

11 Claims, 4 Drawing Sheets

US 10,021,118 B2

PREDICTING ACCOUNT TAKEOVER TSUNAMI USING DUMP QUAKES

TECHNICAL FIELD

The present disclosure generally relates to computer systems and, more particularly, to the security of computer systems, computer networks, and Internet services.

BACKGROUND

Cybercrime generally refers to criminal activity involving computer systems. Such activity includes the use of computer systems to perpetrate crimes and illegally access private electronic data. Cybercriminals may gain access to private user account information in a number of ways. For example, cybercriminals may obtain user account credentials and information by exploiting weaknesses in centralized computer systems, by infiltrating local computer systems of users, by tricking users into providing account information, by stealing user account information directly from a company, and by intercepting user account information traveling over a network.

Cybercriminals may use private user data obtained from a data breach to perform account takeovers. Account takeovers generally describe when cybercriminals use private user data (e.g., account numbers, usernames, passwords, security codes, social security numbers) to take control of an existing financial account (e.g., bank account, credit card account, online store account) and carry out unauthorized transactions. Cybercriminals may steal private user data directly from an organization as part of a data breach. Cybercriminals also may obtain private user data that is sold or shared by another party.

Data breaches, account takeovers, and other fraudulent online schemes continue to increase both in number and in sophistication. Therefore, providing new and improved ways of predicting, detecting, and mitigating such criminal activity is of importance.

BRIEF DESCRIPTION OF THE DRAWINGS

Various examples of the present disclosure will be understood more fully from the detailed description given below and from the accompanying drawings of various examples of the disclosure. In the drawings, like reference numbers may indicate identical or functionally similar elements. The drawing in which an element first appears is generally indicated by the left-most digit in the corresponding reference number.

DETAILED DESCRIPTION

Systems, methods, and computer program products for predicting account takeover tsunamis using dump quakes are disclosed. The number and severity of data breaches have increased dramatically in recent years. In addition, cybercriminals continue to develop new and sophisticated ways of stealing private user data. Such activity usually goes undetected until much later after fraudulent use of the data occurs and both users and organizations have been harmed.

In examples of the present disclosure, a cyber-threat intelligence system monitors activity of a computer system and detects an unexpected increase in system activity during a specific period of time. The cyber-threat intelligence system analyzes account activity in the computer system and determines that the unexpected increase in activity is associated with account validation attacks performed on user accounts by an unauthorized party.

The cyber-threat intelligence system identifies attributes of multiple user accounts associated with the account validation attacks and searches online locations for evidence of a previously undetected data breach. The cyber-threat intelligence system may continue to monitor the online locations periodically to detect a possible future publication of private user data from the suspected data breach. The cyber-threat intelligence system adjusts security settings of the system and sends a notification to at least one other organization prior to the publication of the private user data and a corresponding tsunami (i.e., deluge, wave) of account takeovers associated with the publication of such data.

Accordingly, aspects of the present disclosure provide ways of predicting, detecting, and identifying a previously unknown data breach in advance of the release of private user data from the data breach. Such anticipation allows an organization to prepare for and alert other organizations in advance of fraudulent and destructive behavior of cybercriminals.

Figure 1:
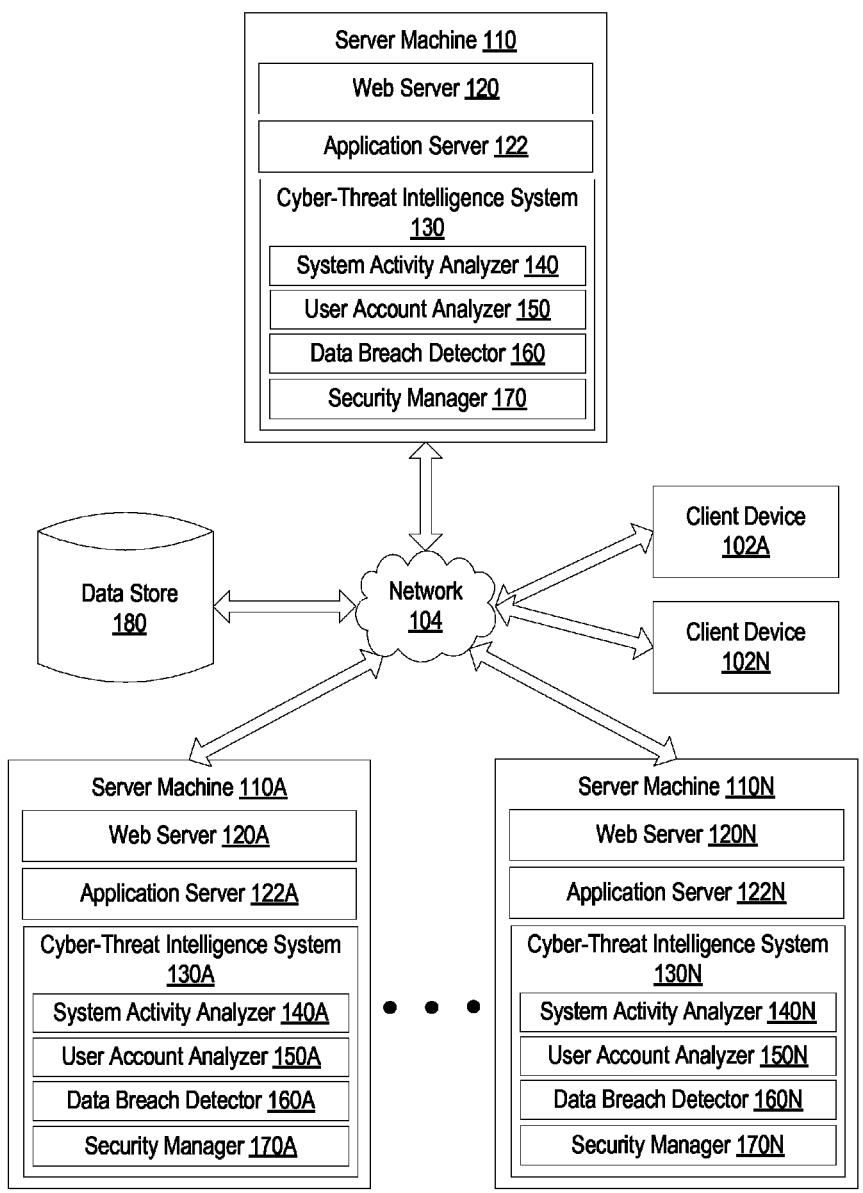
FIG. 1 is a block diagram illustrating a system architecture, in accordance with various examples of the present disclosure.

FIG. 1 illustrates an exemplary system architecture 100 in which examples of the present disclosure may be implemented. System architecture 100 includes a plurality of server machines 110, 110A, 110N, one or more data stores 180, and one or more client devices 102A, 102N connected via one or more networks 104.

Network 104 may be a public network (e.g., the Internet), a private network (e.g., local area network (LAN) or wide area network (WAN)), or any combination thereof. In an example, network 104 may include the Internet, one or more intranets, wired networks, wireless networks, and/or other appropriate types of communication networks. Network 104 also may comprise a wireless telecommunications network (e.g., cellular phone network) adapted to communicate with other communication networks, such as the Internet. In addition, network 104 may include one or more short-range wireless networks or beacon networks.

Data store 180 generally refers to persistent storage capable of storing various types of data, such as text, audio, video, and image content. In some examples, data store 180 may include a network-attached file server, while in other examples data store 180 may include other forms of persistent storage such as an object-oriented database, a relational database, and so forth.

Client devices 102A, 102N generally may be a personal computer (PC), laptop, mobile phone, tablet computer, server computer, wearable computing device, or any other type of computing device (i.e., a client machine). Client devices 102A-102N may run an operating system (OS) that manages hardware and software of the client devices 102A-102N. A browser (not shown) may run on client devices 102A-102N (e.g., on the OS of client devices 102A-102N). The browser may be a web browser that can access content and services provided by web server 120, application server 122, or a combination of web server 120 and application server 122. Other types of computer programs and computer scripts also may run on client devices 102A-102N.

Server machines 110, 110A, 110N each may include one or more web servers 120, 120A, 120N and application servers 122, 122A, 122N. Web servers 120-120N may provide text, audio, image, and video content to and from server machines 110-110N or other sources (e.g., data store 180) and client devices 102A-102N. Web servers 120-120N also may provide web-based application services, business logic, and updates to server machines 110-110N and client devices 102A-102N. Server machines 110-110N may locate, access, and consume various forms of content and services from various trusted (e.g., internal, known) web servers 120-120N and application servers 122-122N and various untrusted (e.g., external, unknown) web and application servers using applications, such as a web browser, web servers, various other types of computer applications, etc. Web servers 120-120N also may receive text, audio, video, and image content from client devices 102A-102N, which may be stored in data store 180 for preservation and/or sharing of content.

In an example, web servers 120-120N are coupled to one or more respective application servers 122-122N that provide application services, data, business logic, and/or APIs to various server machines 110-110N and client devices 102A-102N. In some examples, application servers 122-122N provide one or more such services independently, without use of web servers 120-120N.

In an example, web servers 120-120N may provide server machines 110-110N and client devices 102A-102N with access to one or more application server 122-122N services associated with cyber-threat intelligence systems 130-130N. Such functionality also may be provided as part of one or more different web applications, standalone applications, systems, plug-ins, web browser extensions, and application programming interfaces (APIs), etc. In some examples, plug-ins and extensions generally may be referred to, individually or collectively, as "add-ons."

In an example, client devices 102A-102N may include an application associated with a service provided by one or more server machines 110-110N (e.g., cyber-threat intelligence systems 130-130N). For example, various types of computing devices (e.g., smart phones, smart televisions, tablet computers, smart wearable devices, smart home computer systems, etc.) may use specialized applications to access services provided by server machines 110-110N, to issue commands to server machines 110-110N, and/or to receive content from server machines 110-110N without visiting or using web pages.

Server machines 110-110N each include respective system activity analyzer 140-140N modules, user account analyzer 150-150N modules, data breach detector 160-160N modules, and security manager 170-170N modules. In various examples, such modules may be combined, divided, and organized in various arrangements on one or more computing devices.

In an example, functions performed by one or more of the server machines 110A-110N also may be performed by one or more other server machines 110A-110N and/or client devices 102A-102N, in whole or in part. In addition, the functionality attributed to a particular component may be performed by different or multiple components operating together. Server machines 110-110N may be accessed as a service provided by systems or devices via appropriate application programming interfaces (APIs) and data feeds, and thus are not limited to use with websites. Further, server machines 110-110N may be associated with and/or utilize one or more cyber-threat intelligence systems 130-130N, for example, independently operated by different organizations.

In an example, one or more server machines 110-110N may be specialized security devices dedicated to providing cyber-threat intelligence system 130-130N services. In one example, server machines 110-110N may include one or more of a server computer, router, a switch, a firewall, a security appliance, a dedicated computing device, a shared computing device, a virtual machine, virtual machine guests, etc. In some examples, server machines 110-110N perform activities associated with cyber-threat intelligence systems 130-130N in addition to various other security activities, such as network security, application security, file security, data security, etc.

Figure 2:
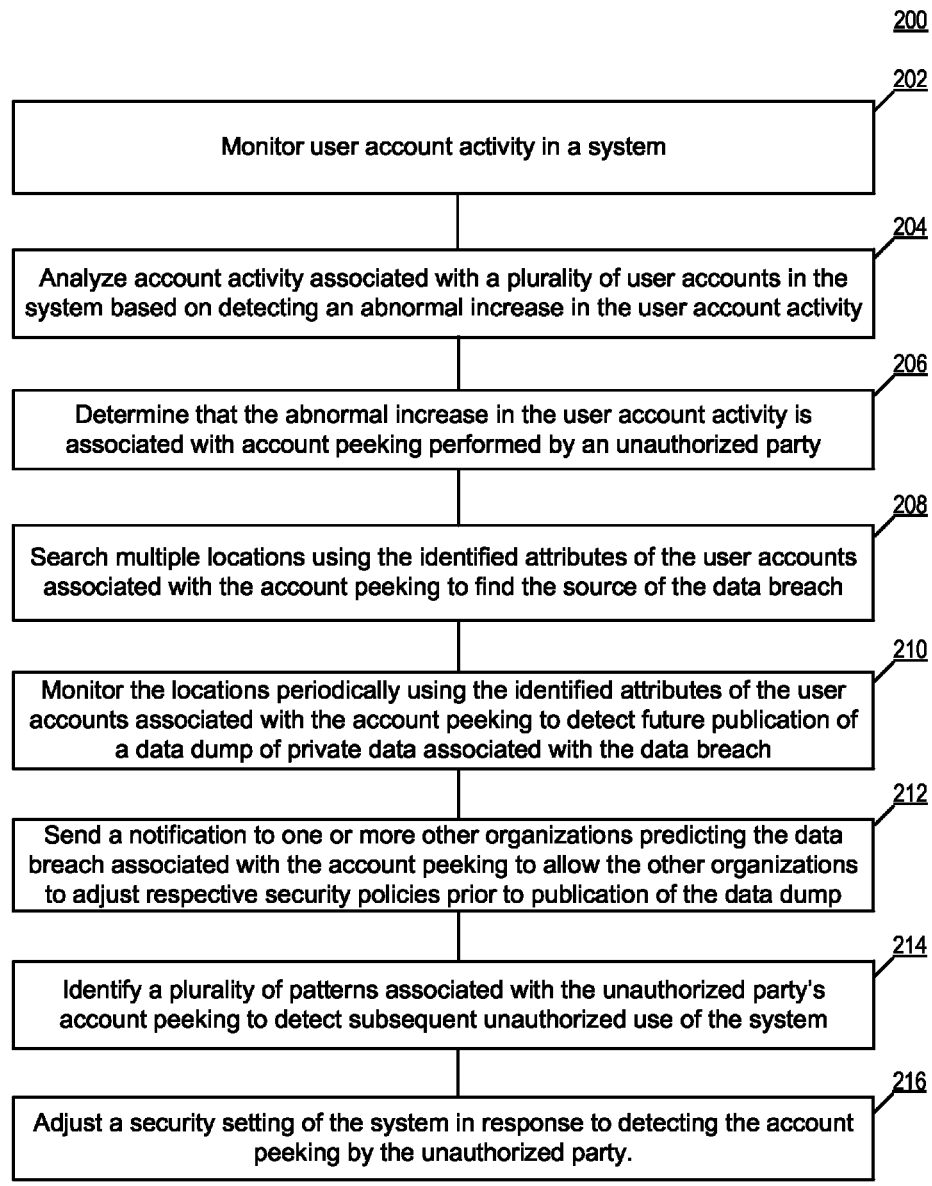
FIG. 2 is a flow diagram for predicting a future public release of private user data associated with a suspected data breach.

FIG. 2 is a flow diagram for predicting a future public release of private user data associated with a suspected data breach. The method 200 may be performed by processing logic that may comprise hardware (e.g., circuitry, dedicated logic, programmable logic, microcode, etc.), software (e.g., instructions run on a general purpose computer system, dedicated machine, or processing device), firmware, or a combination thereof. Examples of method 200 are described with respect to cyber-threat intelligence system 130 for the sake of consistency. In addition, such examples generally apply to other cyber-threat intelligence systems 130A-130N, as described herein.

Method 200 begins at block 202 when system activity analyzer 140 of cyber-threat intelligence system 130 monitors user account activity in a computer system. In an example, system activity analyzer 140 receives and collects user account activity in a computer system (e.g., a financial system, payment provider system, corporate system, government system, public system or any other type of computer system) over a period of time (e.g., seconds, minutes, hours, days, weeks, months, years, etc.). For example, system activity analyzer 140 may store, access, and analyze user account activity recorded in data store 180. Such data may include user account activity data and metadata (e.g., user account activity audit records, user account activity statistics, user account activity volume, user account activity spikes, timing patterns of user account activity, user account activity behavior, etc.) across a system for one or more periods of time.

In an example, system activity analyzer 140 monitors user account activity across an entire system to detect and identify fraudulent and unauthorized behavior that occurs on the system. For example, system activity analyzer 140 may detect irregular or abnormal patterns and increases in user account activity using time-based analysis. In one example, system activity analyzer 140 analyzes user account activity for an isolated or specified period of time (e.g., 1 minute, 5 minutes, 10 minutes, 30 minutes, 1 hour, several hours, 1 day, several days, etc.) to detect spikes in user account activity across a system, which are then used to identify systematic user account validation attacks and other unauthorized activity on the system.

In an example, system activity analyzer 140 detects systematic user account validation attacks based on an unusually high or unexpected amount of activity across a computer system during a period of time. Unusually high or unexpected computer system activity generally may be referred to as irregular "spikes" or "peaks" in system activity. In one example, an unusually high amount of system activity may be caused by systematic user account validation attacks where criminals confirm accessibility, value, security, and other attributes of compromised user accounts.

Such systematic user account validation generally may be referred to as account "peeking" performed by unauthorized parties.

In an example, system activity analyzer 140 detects an abnormal increase in user account activity for system by comparing a baseline of expected user volume or activity for a period of time to user volume or activity that has been observed or recorded at a different point in time. For example, system activity analyzer 140 may detect that user account activity occurring between 9:15 PM and 9:25 PM on a particular Tuesday night exceeds expected user account activity between the hours of 9 PM and 10 PM on a Tuesday night as indicated by a previously captured baseline of expected user account activity.

In addition or alternatively, system activity analyzer 140 may detect that the user account activity occurring between 9:15 PM and 9:25 PM on the particular Tuesday night exceeds user account activity previously observed in the previous fifteen minutes by at least 20 percent. In some examples, system activity analyzer 140 uses one or more thresholds for comparison purposes to detect abnormal increases in user account activity for a system. The one or more thresholds may be provided by a system administrator, a power user such as a security analyst, or by another party via a graphical user interface for configuring and/or managing cyber-threat intelligence system 130.

At block 204, system activity analyzer 140 of cyber-threat intelligence system 130 analyzes user account activity associated with a plurality of user accounts based on detecting an abnormal increase in user account activity. In an example, system activity analyzer 140 determines characteristics and behavior associated with user accounts accessed during a segment of time associated with an abnormal increase in system activity. For example, activity analyzer 140 may determine an identity (e.g., one or more IP addresses, MAC addresses, autonomous system numbers, etc.) for one or more sources of user account activity that each access multiple user accounts during a segment of time associated with an abnormal increase in user account activity. In one example, system activity analyzer 140 identifies attributes of a plurality of the same or different user accounts accessed by one or more parties during a segment of time associated with an abnormal increase in user account activity. System activity analyzer 140 also may determine an identity of each user account and one or more common attributes between each of the user accounts. For example, system activity analyzer 140 may determine that each of the user accounts is associated with the same email provider, domain, network service provider, network, geographic location, merchant, company, etc.

At block 206, user account analyzer 150 of cyber-threat intelligence system 130 determines that the abnormal increase in the user account activity is associated with account validation attacks performed by an unauthorized party. Account validation attacks generally describes activity where an unauthorized party logs into a user account using stolen data to validate that the account exists, that the account is accessible using the stolen data, and to verify available funds or other attributes of an account. In some examples, an unauthorized party performs account validation attacks simply by logging in and out of a user account to confirm that the account is accessible and to determine a value for stolen private data.

Account validation attacks may be performed by one or more unauthorized parties that have stolen, purchased, or otherwise received private user data associated with a data breach. Unauthorized parties may use account validation attacks to verify and value stolen user account data before such data is sold, transferred, or published to other parties. In addition, account validation attacks may be performed in various patterns such as by testing a moderate sampling of user accounts at one time, testing a small number of user accounts over a period of time to avoid detection, or testing a large number of user accounts, such as an entire dump of private user data, within a single session or within a few sessions of close proximity.

In an example, user account analyzer 150 determines that one or more unauthorized parties perform a validation attack at a plurality of user accounts during a period of time associated with an abnormal increase in user account activity or at one or more other various times. For example, user account analyzer 150 determines that one or more unauthorized parties are accessing or validating at a group of the same user accounts. In one example, each unauthorized party accesses or performs a validation attack at the group of user accounts from a different location. In addition, each unauthorized party may access or perform a validation attack at the user accounts in the same order or in one or more various combinations.

In some examples, each unauthorized party may perform a validation attack at the user accounts during the same measured segment(s) of time or at one or more different times. For example, two or more unauthorized parties may perform a validation attack at each of the accounts in close proximity or over a longer period of time (e.g., validation attacks at 6-10 user accounts at a time over a period of four or more days). Thus, some account validation attacks may trigger a spike in user account activity while other account validation attacks may be performed in a manner that attempts to blend in with usual system activity to avoid detection.

At block 208, data breach detector 160 of cyber-threat intelligence system 130 searches multiple locations using the identified attributes of the user accounts associated with the account validation attacks to find the source of the data breach. In an example, data breach detector 160 examines one or more public and/or private computer systems, data stores 180, network locations, virtual worlds, or other online repositories to search for user account data or other sensitive user data published in association with a data breach. For example, data breach detector 160 may search the Internet, network accessible locations, the underground Internet, Tor, an anonymity network, virtual worlds, or any other location where data may be published.

In an example, data breach detector 160 generates and uses one or more attributes of user account data as search criteria to locate a dump of private user data associated with a data breach. For example, data breach detector 160 may use one or more attributes of user accounts (username, current or previous password, account number, telephone number, address, etc.) associated with an abnormal increase in user account activity (e.g., a peak, spike, etc.) as search criteria to locate and confirm publication of private user data associated with a previously known or unknown data breach. Data breach detector 160 also may user one or more attributes of user accounts accessed in groups by one or more unauthorized parties during an abnormal increase in user account activity or at any other time.

In an example, data breach detector 160 identifies one or more dumps of private user data associated with a previously known or previously undiscovered data breach. Data breach detector 160 may remove or seek removal of such private user data from an accessible location. Data breach detector 160 also may extract such information for further analysis. For example, data breach detector 160 may extract a dump of private user data to examine the data that was exposed as part of a data breach. Data breach detector 160 also may use attributes of such data to discover and detect identities and characteristics of previously unknown unauthorized users that attempt to use the data at a later time.

At block 210, data breach detector 160 of cyber-threat intelligence system 130 monitors the locations periodically using the identified attributes of the user accounts associated with the account validation attacks to detect future publication of a data dump of private data associated with the data breach. In an example, continues to monitor one or more previously searched or new network-accessible locations for a dump of private user data associated a data breach. For example, data breach detector 160 may not locate a dump of private user data based attributes of user accounts associated with an abnormal increase in user account activity or suspicious user account activity. However, an abnormal increase in user account activity and/or suspicious user account activity across multiple accounts may subtly indicate that an undetected data breach has occurred in a local or remote system and that a wave of oncoming account takeovers is to be expected. In one example, data breach detector 160 continues to monitor various locations based on one or more indications of an unidentified data breach and sends alerts when a data dump of private user data associated with preliminary detection of a data breach is located (e.g., a first time, or any other time).

At block 212, security manager 170 of cyber-threat intelligence system 130 sends a notification to one or more other organizations predicting the data breach associated with the account validation attacks to allow the other organizations to adjust respective security policies prior to publication of the data dump. In an example, security manager 170 alerts one or more other organizations, or one or more parties within an organization predicting that details associated with one or more abnormal increases in user account activity and/or unusual user account activity over a period of time is likely to be associated with an undiscovered data breach. For example, security manager 170 may send one or more notifications predicting detection of a data breach prior to or after searching for a dump of private user data associated with abnormal increases in user account activity or suspicious user account activity.

At block 214, security manager 170 of cyber-threat intelligence system 130 identifies a plurality of patterns associated with the unauthorized party's account validation attacks to detect subsequent unauthorized use of the system. In an example, security manager 170 examines and analyzes patterns associated with each of one or more unauthorized parties that have performed account validation attacks or other unauthorized activities on the system. For example, security manager 170 may identify common system identifier patterns, common network identification patterns, common network usage patterns, common web browser configuration patterns, common system configuration patterns, and other patterns of an unauthorized party for identifying and detecting the unauthorized party.

In an example, a common pattern, fingerprint, or signature of an unauthorized party may include a source IP address, a range of source IP addresses, one or more autonomous system numbers (ASNs), predictable or repeated network traffic behavior, predictable or repeated system usage behavior, an identifiable user agent string, installed software applications, installed browsers, installed fonts, installed languages, installed character sets, application header data, ordering of application header data, and/or other identifiable attributes of an unauthorized party using a common technological infrastructure to carry out fraudulent schemes. Security manager 170 may use such information to uniquely identify one or more unauthorized parties accessing or attempting to access a computer system.

At block 218, security manager 170 of cyber-threat intelligence system 130 adjusts a security setting of the system in response to detecting the account validation attacks by the unauthorized party. In an example, security manager 170 restricts access to affected user accounts and notifies one or more respective users of a security concern affecting one or more user accounts. For example, security manager 170 may disable a user account, limit certain transactions that can be performed using an account (e.g., purchases, financial transfers, etc.), require step-up or multiple levels of additional authentication to perform one or more activities associated with an account, etc.

Figure 3:
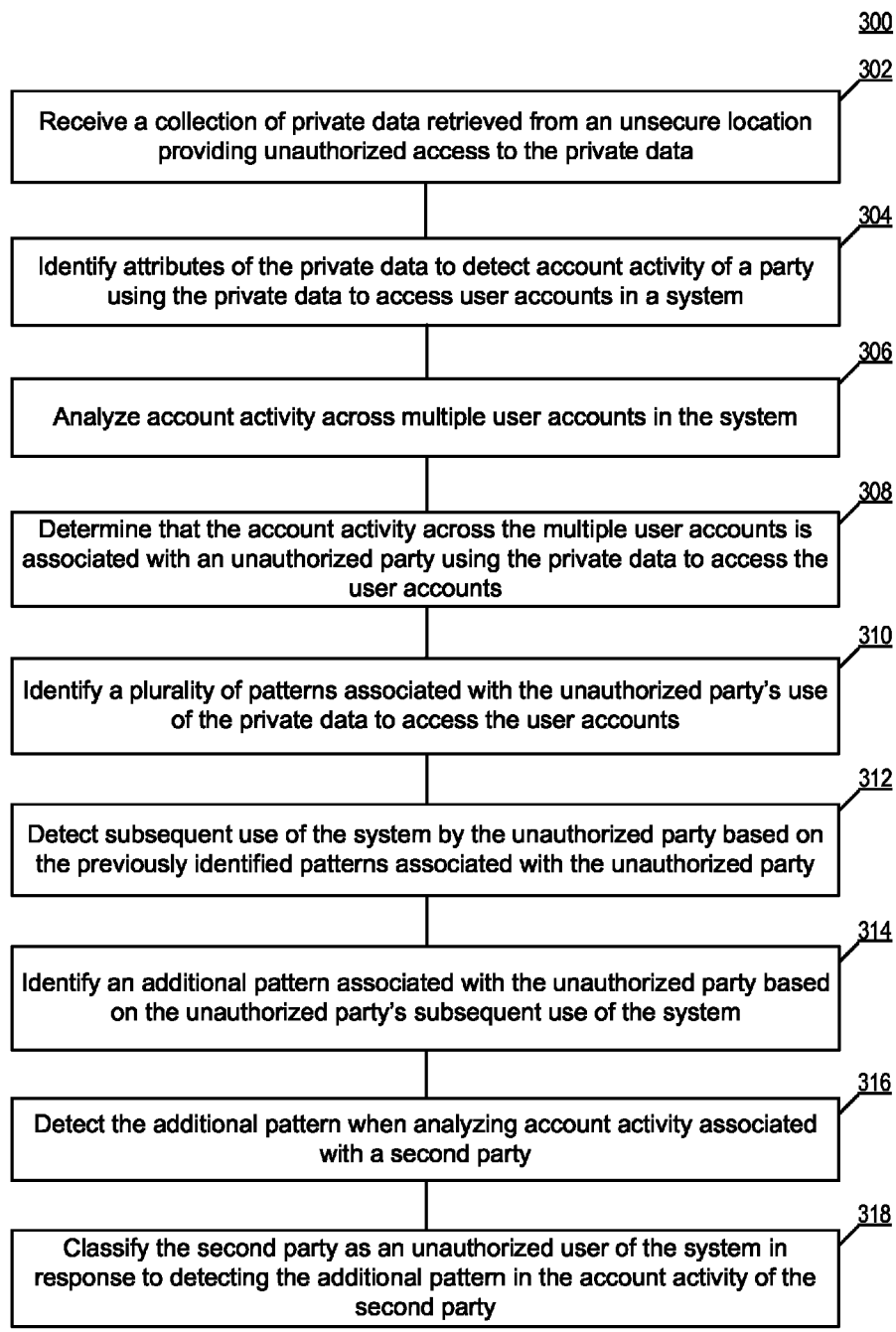
FIG. 3 is a flow diagram for identifying unauthorized user account activity associated with a published dump of private user data.

FIG. 3 is a flow diagram for identifying unauthorized user account activity associated with a published dump of private user data. The method 300 may be performed by processing logic that may comprise hardware (e.g., circuitry, dedicated logic, programmable logic, microcode, etc.), software (e.g., instructions run on a general purpose computer system, dedicated machine, or processing device), firmware, or a combination thereof. Examples of method 300 are described with respect to cyber-threat intelligence system 130 for the sake of consistency. In addition, such examples generally apply to other cyber-threat intelligence systems 130A-130N, as described herein.

Method 300 begins at block 302 when data breach detector 160 of cyber-threat intelligence system 130 receives a collection of private data retrieved from an unsecure location providing unauthorized access to the private data. In an example, data breach detector 160 uses one or more attributes for each of a plurality of user accounts associated with an abnormal increase in account activity or suspicious account activity to search for a dump of user data associated with a known or previously undetected data breach. User account attributes include, but are not limited to, full or partial usernames, current or previous passwords, account numbers, telephone numbers, addresses, personal identification numbers, etc.

In an example, data breach detector 160 finds one or more dumps of private user data associated with a known or previously undiscovered data breach. For example, data breach detector 160 may find one or more dumps of private user data when searching the Internet, network accessible locations, the underground Internet, Tor, an anonymity network, a virtual world, or any other location where data may be available. Data breach detector 160 then may retrieve a dump of private user data for use in analyzing user account activity and detecting existing and new unauthorized behavior in a computer system.

At block 304, data breach detector 160 of cyber-threat intelligence system 130 identifies attributes of the private data to detect account activity of a party using the private data to access user accounts in a system. In an example, data breach detector 160 extracts details associated with one or more individuals and/or one or more user accounts from a retrieved dump of private user data. Data breach detector 160 then uses one or more of the extracted details to detect attempted or actual unauthorized access to user accounts in a system.

In an example, data breach detector 160 matches one or more of the extracted details to a user account or an individual associated with a user account. For example, security manager 170 may notify and adjust security settings for user accounts associated with a data breach. In some examples, security manager 170 may disable a user account, limit certain transactions that can be performed using an account, require step-up or multiple levels of additional authentication to perform one or more activities associated with an account, etc.

At block 306, user account analyzer 150 of cyber-threat intelligence system 130 analyzes account activity across multiple user accounts in the system. In an example, user account analyzer 150 monitors user account activity in a system to detect unauthorized use of the system by one or more parties. For example, user account analyzer 150 may use a combination of one or more details (e.g., full or partial usernames, e-mail addresses, passwords, telephone numbers, account numbers, personal identification numbers, etc.) from a dump of private user data to detect attempted or actual unauthorized access to user accounts. In one example, unauthorized use of user accounts is detected when system activity analyzer 140 discovers an abnormal increase in user account activity and user account analyzer 150 correlates use of a plurality of accounts to published private user data or suspicious activity associated with some, most, or all of a group of the same user accounts.

In an example, user account analyzer 150 tracks usage of user accounts associated with published private user data from a data breach. For example, user account analyzer 150 may monitor whether a single party or multiple parties attempt to or actually access user accounts associated with a data breach. In one example, user account analyzer 150 determines that one or more parties access a plurality of the same or different user accounts of published private user data from a data breach. For example, user account analyzer 150 may determine that each of different parties accesses a plurality of different user accounts associated with published private user data in the same order or in different orders.

At block 308, data breach detector 160 of cyber-threat intelligence system 130 determines that the account activity across the multiple user accounts is associated with an unauthorized party using the private data to access the user accounts. In an example, data breach detector 160 determines that an unauthorized party is performing account validation attacks or performing other unauthorized or fraudulent activities involving user accounts. In one example, data breach detector 160 determines that one or more unauthorized parties are accessing user accounts associated with published private user data from a data breach. Data breach detector 160 may match one or more details of published private user data from a data breach to a plurality of user accounts accessed by one or more parties within a single measured segment of time or across multiple measured segments of time. For example, data breach detector 160 may determine that one unauthorized party is attempting to validate a list of user accounts, in a particular order or in any order, in a single session. Data breach detector 160 also may determine that another unauthorized party peeked at the same list of user accounts over a period of multiple sessions, perhaps in an effort to avoid detection.

At block 310, security manager 170 of cyber-threat intelligence system 130 identifies a plurality of patterns associated with the unauthorized party's use of the private data to access the user accounts. In an example, security manager 170 identifies a plurality of common infrastructure, timing, behavior, and/or other elements used by an unauthorized party to access user account data. For example, security manager 170 may examine and analyze patterns of an unauthorized party performing account validation attacks or other fraudulent activities on user accounts. In one example, security manager 170 identifies a plurality of common system identifier patterns, common network identification patterns, common network usage patterns, common web browser configuration patterns, common system configuration patterns, or other patterns of an unauthorized party's use of a system. Common patterns, fingerprints, or signatures of an unauthorized party may include, but are not limited to, a source IP address, a range of source IP addresses, one or more autonomous system numbers (ASNs), predictable or repeated network traffic behavior, predictable or repeated system usage behavior, an identifiable user agent string, installed software applications, installed browsers, installed fonts, installed languages, installed character sets, application header data, ordering of application header data, and/or other identifiable attributes of an unauthorized party using a common technological infrastructure to carry out fraudulent schemes. Security manager 170 then may use such information to uniquely identify current and future activity performed by one or more unauthorized parties.

At block 312, security manager 170 of cyber-threat intelligence system 130 detects subsequent use of the system by the unauthorized party based on the previously identified patterns associated with the unauthorized party. In an example, security manager 170 uses a plurality of patterns previously observed, identified, and collected for an unauthorized party to identify subsequent system and user account activity performed by an unauthorized party. For example, once security manager 170 has identified multiple patterns that uniquely identify an unauthorized party, those patterns can be later used to detect and collect new information about the future patterns and behavior associated with subsequent activity of the unauthorized party. Further, detecting, observing, monitoring, collecting, and analyzing subsequent activity of an identified unauthorized user allows security manager 170 to discover new, previously undiscovered fraudulent schemes. Such intelligence also allows security manager 170 to discover one or more new patterns associated with the unauthorized party that were previously unknown or undiscovered, even as fraudulent tools and schemes evolve and become more sophisticated over time.

In an example, security manager 170 detects subsequent system use of a previously identified unauthorized party by matching a plurality of previously identified patterns of the unauthorized party to patterns associated with the subsequent use of the system. For example, security manager 170 may determine that an unauthorized party is accessing or attempting to access a system by matching two or more of a source IP address, an autonomous system number, an identifiable user agent string, and a unique combination of installed software applications, installed browsers, installed fonts, installed languages, installed character sets, application header data, ordering of application header data, or other attributes to a user session.

At block 314, security manager 170 of cyber-threat intelligence system 130 identifies an additional pattern associated with the unauthorized party based on the unauthorized party's subsequent use of the system. In an example, after security manager 170 detects subsequent activity of an unauthorized party, security manager 170 monitors and collects additional information about the unauthorized party. For example, security manager 170 may update one or more modified patterns of an unauthorized party and may record one or more new patterns learned about an unauthorized party. In one example, security manager 170 uses the subsequent identification of an unauthorized party to detect one or more new patterns associated with a new data breach or fraudulent scheme (e.g., new predictable or repeated network traffic behavior, new predictable or repeated system usage behavior, etc.). For example, security manager 170 may determine that an unauthorized party has returned to access new user accounts unrelated to a previous activity, which may be associated with a new data breach. Further, new patterns of system and user account usage by an unauthorized party provide insight into and the ability to detect new, modified, or previously undiscovered fraudulent schemes.

At block 316, security manager 170 of cyber-threat intelligence system 130 detects the additional pattern when analyzing account activity associated with a second party. In an example, detects a previously known or unknown unauthorized party. For example, security manager 170 may distinguish respective identifies of each unauthorized party based on two or more identified patterns uniquely identifying a respective party, such as source IP addresses, autonomous system numbers, domains, unique configurations, unique system usage behavior, unique account usage behavior, etc.

In an example, security manager 170 uses a newly discovered pattern about a known unauthorized party accessing a system to discover new unauthorized parties or new activity of other previously known unauthorized parties. For example, security manager 170 detects that a new or previously known party is associated with a new pattern discovered in subsequent use of a system by an unauthorized party. In one example, a different party may access the system from a different IP address, autonomous system number, or location than a known unauthorized party. However, the other party may be using the same uniquely identifiable tools the same uniquely identifiable configuration, the same uniquely identifiable behavior and/or other traits and characteristics that have been learned based on monitoring an unauthorized party over a period of time in subsequent sessions after initial detection.

At block 318, security manager 170 of cyber-threat intelligence system 130 classifies the second party as an unauthorized user of the system in response to detecting the additional pattern in the account activity of the second party. In an example, security manager 170 records a plurality of patterns of a second party that is associated with one or more newly detected patterns of an unauthorized party. Further, security manager 170 updates a classification or status of the second party indicating that the second party is an unauthorized party or user of the system. Security manager 170 then monitors subsequent system use and behavior of the second party to learn about new fraudulent schemes and to identify additional fraudulent actors.

Figure 4:
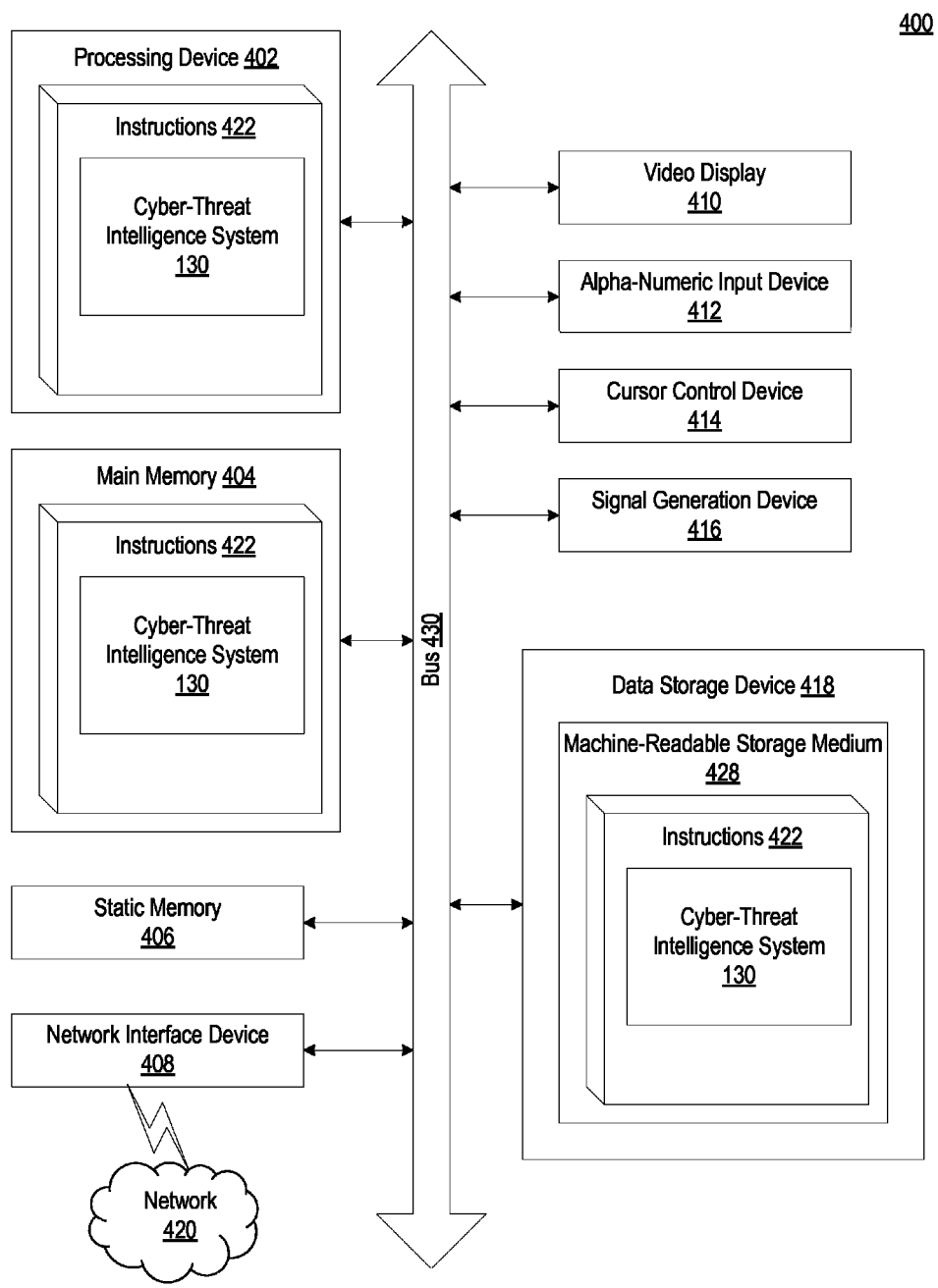
FIG. 4 is a block diagram of an exemplary computer system that may perform one or more of the operations described herein.

FIG. 4 illustrates a diagram of a machine in the exemplary form of a computer system 400, within which a set of instructions for causing the machine to perform any one or more of the methodologies discussed herein may be executed. In other examples, the machine may be connected (e.g., networked) to other machines in a LAN, an intranet, an extranet, or the Internet. The machine may operate in the capacity of a server or a client device in client-server network environment, or as a peer machine in a peer-to-peer (or distributed) network environment. The machine may be a personal computer (PC), a tablet PC, a set-top box (STB), a Personal Digital Assistant (PDA), a cellular telephone, a wearable computing device, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device (processor) 402, a main memory 404 (e.g., read-only memory (ROM), flash memory, dynamic random access memory (DRAM) such as synchronous DRAM (SDRAM), double data rate (DDR SDRAM), or DRAM (RDRAM), etc.), a static memory 406 (e.g., flash memory, static random access memory (SRAM), etc.), and a data storage device 418, which communicate with each other via a bus 430.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 also may be one or more special-purpose processing devices such as an application specific integrated circuit (ASIC), a field programmable gate array (FPGA), a digital signal processor (DSP), network processor, or the like. The processor 402 is configured to execute instructions 422 for performing the operations and steps discussed herein.

The computer system 400 also may include a network interface device 408. The computer system 400 may further include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a computer-readable storage medium 428 on which is stored one or more sets of instructions 422 (e.g., software computer instructions) embodying any one or more of the methodologies or functions described herein. The instructions 422 also may reside, completely or at least partially, within the main memory 404 and/or within the processor 402 during execution thereof by the computer system 400, the main memory 404 and the processor 402 also constituting computer-readable storage media. The instructions 422 may be transmitted or received over a network 420 via the network interface device 408.

In one example, the instructions 422 include instructions for one or more modules of a cyber-threat intelligence system (e.g., cyber-threat intelligence system 130, 130A, 130N of FIG. 1) and/or a software library containing methods that call a cyber-threat intelligence system 130, 130A, 130N. While the computer-readable storage medium 428 (machine-readable storage medium) is shown as an example to be a single medium, the term "computer-readable storage medium" should be taken to include a single medium or multiple media (e.g., a centralized or distributed database, and/or associated caches and servers) that store the one or more sets of instructions. The term "computer-readable storage medium" also may include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Numerous details are set forth in the foregoing description. However, it will be apparent to one of ordinary skill in the art having the benefit of this disclosure that the present disclosure may be practiced without these specific details. In some instances, well-known structures and devices are shown in block diagram form, rather than in detail, to avoid obscuring the present disclosure.

Some portions of the detailed description have been presented in terms of algorithms and symbolic representations of operations on data bits within a computer memory. Here, an algorithm is generally conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "computing," "comparing," "associating," "applying," "transmitting," "receiving," "processing" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other examples will be apparent to those of skill in the art upon reading and understanding the above description. The scope of the disclosure therefore should be determined with reference to the appended claims, along with the full scope of equivalents to which such claims are entitled.

What is claimed is:

1. A computer system for detecting a security breach, comprising:
   a non-transitory memory; and
   one or more processors coupled to the non-transitory memory and configured to read instructions from the non-transitory memory to cause the computer system to perform operations comprising:
      monitoring, via a virtual machine on the computer system, user account activity in a first computer system;
      detecting, via the virtual machine, the user account activity exceeding a first threshold during a period of time;
      analyzing, via the virtual machine, account activity associated with a plurality of user accounts in the first computer system based on the detecting the user account activity exceeding the first threshold;
      determining, via the virtual machine, that the user account activity exceeding the first threshold is, at least in part, due to account validation attacks performed by an unauthorized party on the plurality of user accounts indicative of valuing the plurality of user accounts;
      identifying, via the virtual machine, attributes of the plurality of user accounts to search for a source of a data breach associated with the account validation attacks;
      identifying, via the virtual machine, a plurality of patterns associated with the unauthorized party based on the account validation attacks to detect subsequent unauthorized use of the first computer system by the unauthorized party;
      adjusting, via the virtual machine, a security setting of the first computer system in response to detecting the account validation attacks; and
      monitoring, via the virtual machine, a plurality of online locations associated with third parties providing unauthorized access to private data based on the identified attributes of the plurality of user accounts to detect future publication of a private data dump associated with the data breach.

2. The computer system of claim 1, wherein the operations further comprise:
   searching the plurality of online locations using the identified attributes of the plurality of user accounts to determine the source of the data breach.

3. The computer system of claim 1, wherein the determining that the user account activity exceeding the first threshold comprises determining that the user account activity consists of logging in and logging out of each of the plurality of user accounts.

4. The computer system of claim 1, wherein the identifying the plurality of patterns comprises determining that each of the plurality of user accounts is accessed from a plurality of different locations.

5. The computer system of claim 1, wherein the operations further comprise:
   sending a notification to one or more other organizations predicting the data breach associated with the account validation attacks to allow the one or more other organizations to adjust respective security policies prior to publication of private user data associated with the data breach.

6. A method for detecting a security breach, comprising:
   monitoring, by a virtual machine on a computer system, user account activity in a first computer system;
   detecting, by the virtual machine, the user account activity exceeding a first threshold for a period of time;
   analyzing, by the virtual machine, account activity associated with a plurality of user accounts in the first computer system based on the detecting the user account activity exceeding the first threshold;
   determining, by the virtual machine, that the user account activity exceeding the first threshold is, at least in part, due to account peeking performed by an unauthorized party on the plurality of user accounts indicative of valuing the plurality of user accounts;
   identifying, by the virtual machine, attributes of the plurality of user accounts to search for a source of a data breach associated with the account peeking;

searching, by the virtual machine, a plurality of network-accessible locations using the identified attributes of the plurality of user accounts associated with the account peeking to determine the source of the data breach;

adjusting, by the virtual machine, a plurality of security settings of the first computer system in response to detecting the account peeking; and monitoring, by the virtual machine, a plurality of online locations associated with third parties providing unauthorized access to private data based on the identified attributes of the plurality of user accounts to detect future publication of a private data dump associated with the data breach.

7. The method of claim 6, further comprising:
identifying, by the virtual machine, a plurality of patterns associated with the unauthorized party based on the account peeking to detect subsequent unauthorized use of the first computer system.

8. The method of claim 6, wherein the determining that the user account activity exceeding the first threshold comprises determining that the user account activity consists of logging in and logging out of each of the plurality of user accounts.

9. The method of claim 7, wherein the identifying the plurality of patterns comprises determining that each of the plurality of user accounts is accessed from a plurality of different locations.

10. The method of claim 6, further comprising:
sending, by the virtual machine, a notification to one or more other organizations predicting the data breach associated with the account peeking to allow the one or more other organizations to adjust respective security policies prior to publication of private user data associated with the data breach.

11. The method of claim 6, further comprising:
receiving, by the virtual machine via a computer network, a collection of private user data associated with the data breach associated with one or more of the identified attributes of the plurality of user accounts associated with the account peeking.

* * * * *